United States Patent
Kiyohara et al.

(10) Patent No.: US 6,678,576 B2
(45) Date of Patent: Jan. 13, 2004

(54) METHOD OF LOADING CONTAINERS IN AN OPTIMUM WAY ON A LOAD-CARRYING PLATFORM OF A VEHICLE

(75) Inventors: Nobuyoshi Kiyohara, Tokyo (JP); Yoshinori Kuroda, Tokyo (JP); Tatsuo Koyama, Tokyo (JP); Yoshihei Iwai, Tokyo (JP); Makoto Arai, Tokyo (JP); Hidekazu Takahashi, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/278,848

(22) Filed: Oct. 24, 2002

(65) Prior Publication Data

US 2003/0086781 A1 May 8, 2003

(30) Foreign Application Priority Data

Nov. 5, 2001 (JP) ...................................... 2001-339213

(51) Int. Cl.$^7$ ................................................. G06F 7/00
(52) U.S. Cl. ...................................... 700/213; 414/809
(58) Field of Search .......................... 700/213; 414/800, 414/801, 802, 809

(56) References Cited

U.S. PATENT DOCUMENTS 4,640,657 A * 2/1987 Moore et al. ................ 414/347
5,322,350 A * 6/1994 Hinson ........................ 298/1 R

FOREIGN PATENT DOCUMENTS

JP 59-31223 2/1984
JP 8-244981 9/1996

* cited by examiner

Primary Examiner—Khoi H. Tran
(74) Attorney, Agent, or Firm—Arent Fox Kintner Plotkin & Kahn, PLLC

(57) ABSTRACT

A method of loading containers in an optimum way on a load-carrying platform of a vehicle calculates moment weight $W_i \cdot i$ which is multiplication of total weight $W_i$ of containers in each row distant forward by i rows from the platform center by i; calculating moment weight $W_{-i} \cdot i$ which is multiplication of total weight $W_{-i}$ of containers in each row distant rearward by i rows from the platform center by i; calculating the bias load ratio in the traveling direction, which is the ratio of the difference $|\Sigma W_i \cdot i - \Sigma W_{-1} \cdot i|$ between the total $\Sigma W_i \cdot i$ of moment weights of rows located forward of the platform center C and the total $\Sigma W_{-1} \cdot i$ of moment weights of rows located rearward of the platform center C relative to the sum of same $(\Sigma W_i \cdot i + \Sigma W_{-i} \cdot i)$; similarly calculating the bias load ratio in the breadth direction; and loading the containers such that the calculated bias load ratio in the traveling direction falls within a predetermined range and the calculated bias load ratio in the breadth direction falls within a predetermined range. When loading containers of various weights in front-to-rear and right-to-left alignments, this method is a very practical, optimum method of loading containers, with which any operator can easily select a loading layout of the optimum balance.

3 Claims, 7 Drawing Sheets

Fig.5(1) TRAVELING DIRECTION
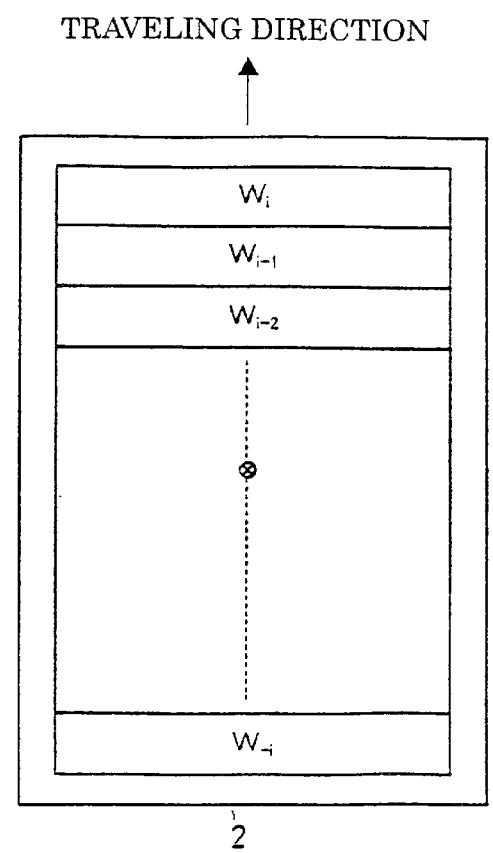
Fig.5(2) BREADTH DIRECTION
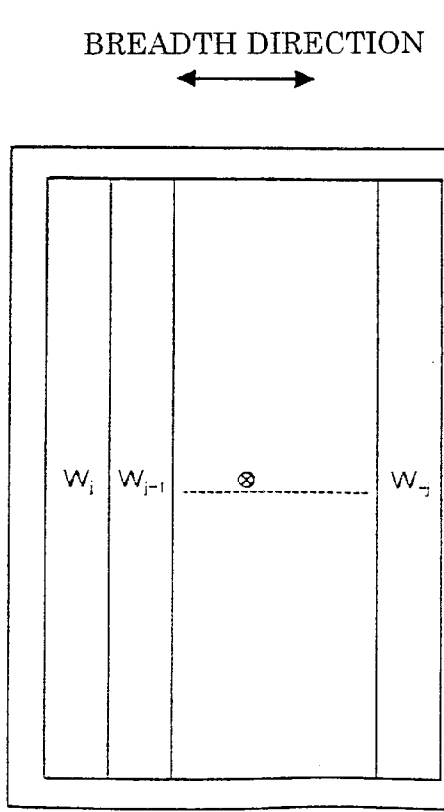

METHOD OF LOADING CONTAINERS IN AN OPTIMUM WAY ON A LOAD-CARRYING PLATFORM OF A VEHICLE

BACKGROUND OF THE INVENTION

1. Technical Field

This invention relates to a method of loading containers in an optimum way on a load-carrying platform of a vehicle.

2. Prior Art

In case a plurality of containers of the same shape are loaded on a load-carrying platform of a truck, for example, load of containers is often one-sided to the front, rear, right or left side even when loaded in centrally symmetrical placement on the platform due to a difference in weight of cargoes contained in respective containers.

If a vehicle with one-sided load drives, one-sided centrifugal load may work on the platform while the vehicle goes around a curve, and may therefore degrade the stability.

To avoid this, for loading containers in one row in the front-to-rear direction, there is proposed a method of weighting respective containers for evaluating the loading balance and determining the optimum front-to-rear position of containers to optimize the front-to-rear loading balance (Japanese Patent Laid-Open Publication No. sho 59-31223).

This method is directed to loading containers in one row in the front-to-rear direction, and determines the loading pattern such that the sum total of weights of respective containers becomes zero. The containers loaded are equal in weight.

Further, a method of evaluating the balance upon loading cargoes different in shape was invented earlier by the same inventors of the present invention, and it has been disclosed in Japanese Patent Laid-Open Publication No. hei 8-244981.

The method disclosed therein divides the loading space into unit spaces each sized equally to the size of the smallest of cargoes to be loaded, then assigns the weight of each cargo to be loaded to each cargo address corresponding to one or more unit spaces, thereafter calculates its moment, and finally calculates the weight balance ratio of the loading space from that moment.

The prior art of the former publication (Japanese Patent Laid-Open Publication No. sho 59-31223) handling containers equal in weight can load containers such that the sum total of weights becomes zero. This prior art, however, does not teach its application to loading containers different in weight of cargoes contained therein or loading containers in a two-dimensional layout other than the front-to-rear single row, and its applicable range is narrow accordingly.

The latter prior art (Japanese Patent Laid-Open Publication No. hei 8-24981) relates to loading cargoes not uniform in shape unlike containers, and it is therefore compelled to divide the loading space into unit spaces each sized equally to the size of the smallest of cargoes to be loaded and then assign the weight of each cargo to be loaded to each cargo address corresponding to one or more unit spaces. These steps are very troublesome, and this method is not so practical.

Taking those problems into consideration, it is an object of the invention to provide an optimum method of loading containers, which is capable of easily determining the optimum loading balance when loading containers various in weight over front-to-rear and right-to-left dimensions, and is therefore very practical.

SUMMARY OF THE INVENTION

To accomplish the object, the invention provides a method of loading containers in an optimum way on a load-carrying platform of a vehicle, in which a plurality of containers identical in shape are loaded in front-to-rear and left-to-right matrix arrangement symmetrically of the platform center, comprising: calculating moment weight $W_i \cdot i$ which is multiplication of total weight $W_i$ of containers in each row distant forward by i rows from the platform center by i; calculating moment weight $W_{-1} \cdot i$ which is multiplication of total weight $W_{-1}$ of containers in each row distant rearward by i rows from the platform center by i; calculating the bias load ratio in the traveling direction, which is the ratio of the difference $|\Sigma W_i \cdot i - \Sigma W_{-1} \cdot i|$ between the total $\Sigma W_i \cdot i$ of moment weights of rows located forward of the platform center C and the total $\Sigma W_{-i} \cdot i$ of moment weights of rows located rearward of the platform center C relative to the sum of same ($\Sigma W_i \cdot i + \Sigma W_{-1} \cdot i$); calculating moment weight $W_j \cdot j$ which is multiplication of total weight $W_j$ of containers in each column distant leftward by j columns from the platform center by j; calculating moment weight $W_{-j} \cdot j$ which is multiplication of total weight $W_{-j}$ of containers in each column distant rightward by j columns from the platform center by j; calculating the bias load ratio in the breadth direction, which is the ratio of the difference $|\Sigma W_j \cdot j - \Sigma W_{-j} \cdot j|$ between the total $\Sigma W_j \cdot j$ of moment weights of columns located leftward of the platform center C and the total $\Sigma W_{-j} \cdot j$ of moment weights of columns located rightward of the platform center C relative to the sum of same ($\Sigma W_j \cdot j + \Sigma W_{-j} \cdot j$); and loading the containers such that the calculated bias load ratio in the traveling direction falls within a predetermined range and the calculated bias load ratio in the breadth direction falls within a predetermined range.

Therefore,

Bias load ratio in the traveling direction $= |\Sigma W_i \cdot i - \Sigma W_{-i} \cdot i| / (\Sigma W_i \cdot i + \Sigma W_{-1} \cdot i)$ and Bias load ratio in the breadth direction $= |\Sigma W_j \cdot j - \Sigma W_{-j} \cdot j| / (\Sigma W_j \cdot j + \Sigma W_{-j} \cdot j)$ Therefore, once the weight of each container (weight of cargoes contained therein and own weight of the container) to be loaded is input, respective total weights of containers $W_i$, $W_{-1}$, $W_j$, $W_{-j}$ and respective moment loads $W_i \cdot i$, $W_{-i} \cdot i$, $W_j \cdot j$, $W_{-j} \cdot j$ are readily determined, and the bias load ratio in the traveling direction and the bias load ratio in the breadth direction can be calculated from the above equations.

With the method according to the invention, containers may be loaded such that the bias load ratio in the traveling direction and the bias load ratio in the breadth direction obtained by the calculation fall within predetermined ratios, and the load balance condition can be easily confirmed to be acceptable or not. Therefore, the method is convenient and very practical.

In the method of loading containers in an optimum way on a load-carrying platform of a vehicle according to the invention, i=0 or j=0 may be assumed for calculation of containers in a column or row that coincides with the center of the load-carrying platform.

When containers are loaded in odd number rows or odd number columns, the central row or column coincides with the platform center. Then i=0 or j=0 is assumed for calculation.

That is, the row or column coinciding with the platform center may be regarded not to exist for calculation.

In the method of loading containers in an optimum way on a load-carrying platform of a vehicle according to the invention, containers are preferably loaded such that the bias load ratio in the traveling direction is limited approximately within 8% and the bias load ratio in the breadth direction is limited within approximately 4 percent.

If the bias load ratio in the traveling direction is within approximately 8% and the bias load ratio in the breadth direction is approximately within 4%, the loading balance is good, and a vehicle with containers loaded in this condition does not lose stability even when a centrifugal load is applied to its load-carrying platform while it runs along a curve.

BRIEF DESCRIPTION OF THE DRAWINGS

FIGS. 5(1) and 5(2) are diagrams each showing total weights of individual rows and individual columns, respectively;

DESCRIPTION OF THE PREFERRED EMBODIMENT

An embodiment of the invention will now be described with reference to FIGS. 1 through 7.

Figure 1:
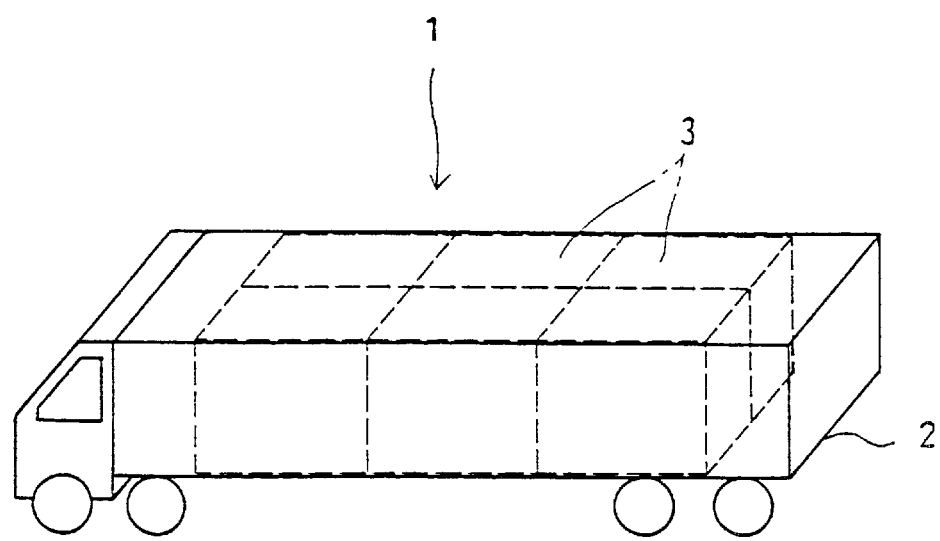
FIG. 1 is a perspective view roughly showing a truck with containers loaded on the load-carrying platform thereof, taken as an embodiment of the invention.

As shown in FIG. 1, containers 3 of an identical shape are loaded in a front-to-rear and right-to-left arrangement on a load-carrying platform 2 of a truck 1.

A personal computer 10 judges whether the containers 3 are loaded in a well-balanced condition on the platform 2. At the same time, the personal computer 10 can determine an arrangement of the containers 3 with a good loading balance.

Figure 2:
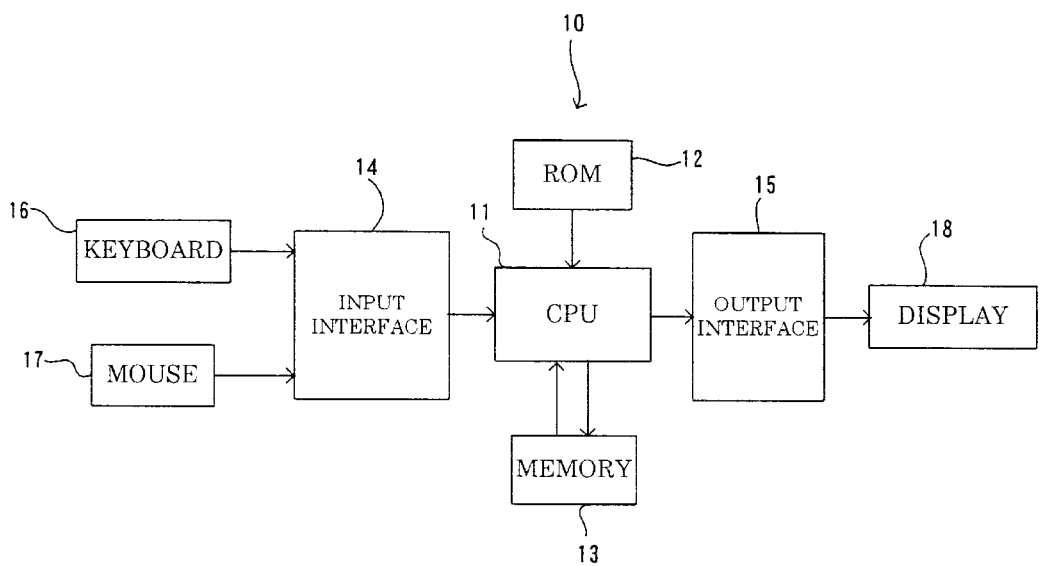
FIG. 2 is a diagram roughly showing a personal computer.

In the personal computer 10, a central control unit, CPU, 11 executes arithmetic processing by adequately using RAM 13 according to a program stored in ROM 12 as shown in FIG. 2.

CPU 11 processes input data input from a keyboard 16 or mouse 17 through an input interface 14, and outputs the result of the processing to a display 18 through an output interface 15.

Figure 4:
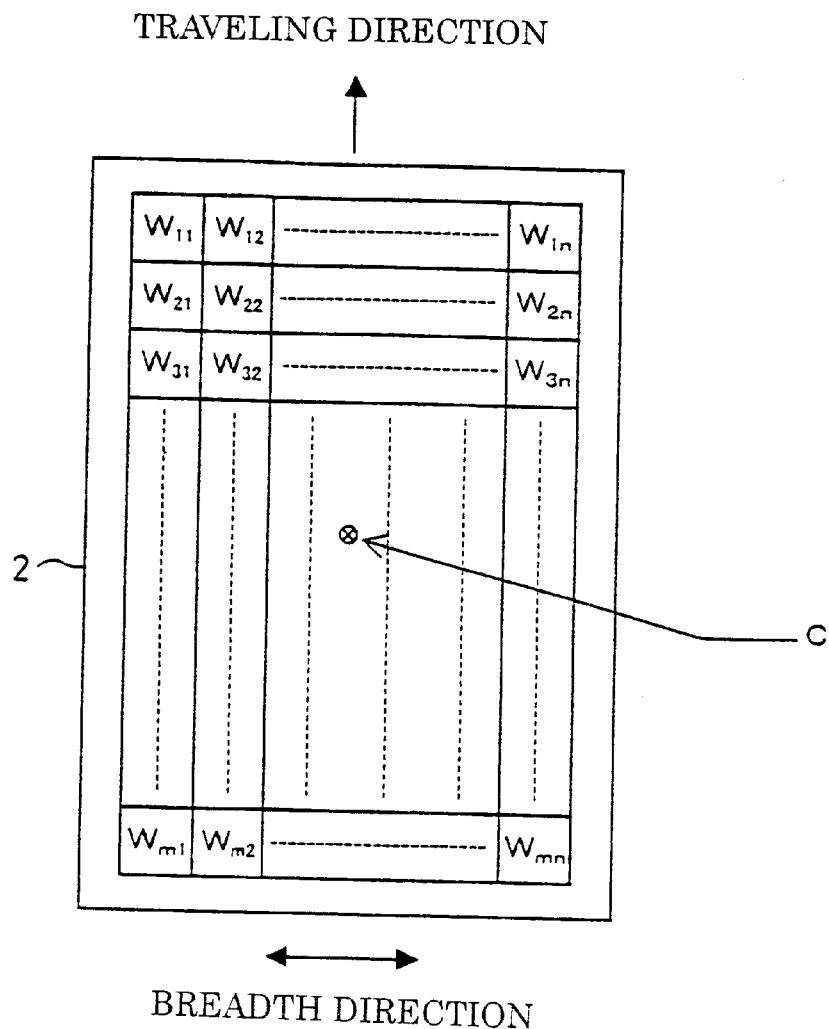
FIG. 4 is a diagram that shows an arrangement of containers in m rows and n columns on a load-carrying platform.

Assume here that, as shown in FIG. 4, containers 3 are loaded in m rows and n columns in the front-to-rear and right-to-left directions, namely, in m rows in the traveling direction and n columns in the breadth direction, on the platform 2, and weights (weights of cargoes contained in the containers plus weights of the containers) of containers 3 placed in individual cells of the matrix are shown by affixing subscripts of the cell numbers of the matrix as $W_{11}$, $W_{12}$, ..., $W_{1n}$, $W_{21}$, $W_{22}$, ..., $W_{m1}$, $W_{m2}$, ..., $W_{mn}$.

These m×n containers 3 are placed symmetrically about the center C of the platform in a close alignment of m rows and n columns. In this case, heavier containers 3 are placed closer to the platform center C such that the entirety is well-balanced as far as possible in the front-to-rear and right-to-left directions.

The weights $W_{11}$, $W_{12}$, ..., $W_{1n}$, $W_{21}$, $W_{22}$, ..., $W_{2n}$, ..., ..., $W_{m1}$, $W_{m2}$, ..., $W_{mn}$ of the containers 3 in the array with m rows and n columns are input into the personal computer 10. The personal computer 10 carries out arithmetic operation of the bias load ratio α in the traveling direction and the bias load ratio β in the vehicle breadth direction, and judges whether the loading balance is acceptable or not.

Figure 3:
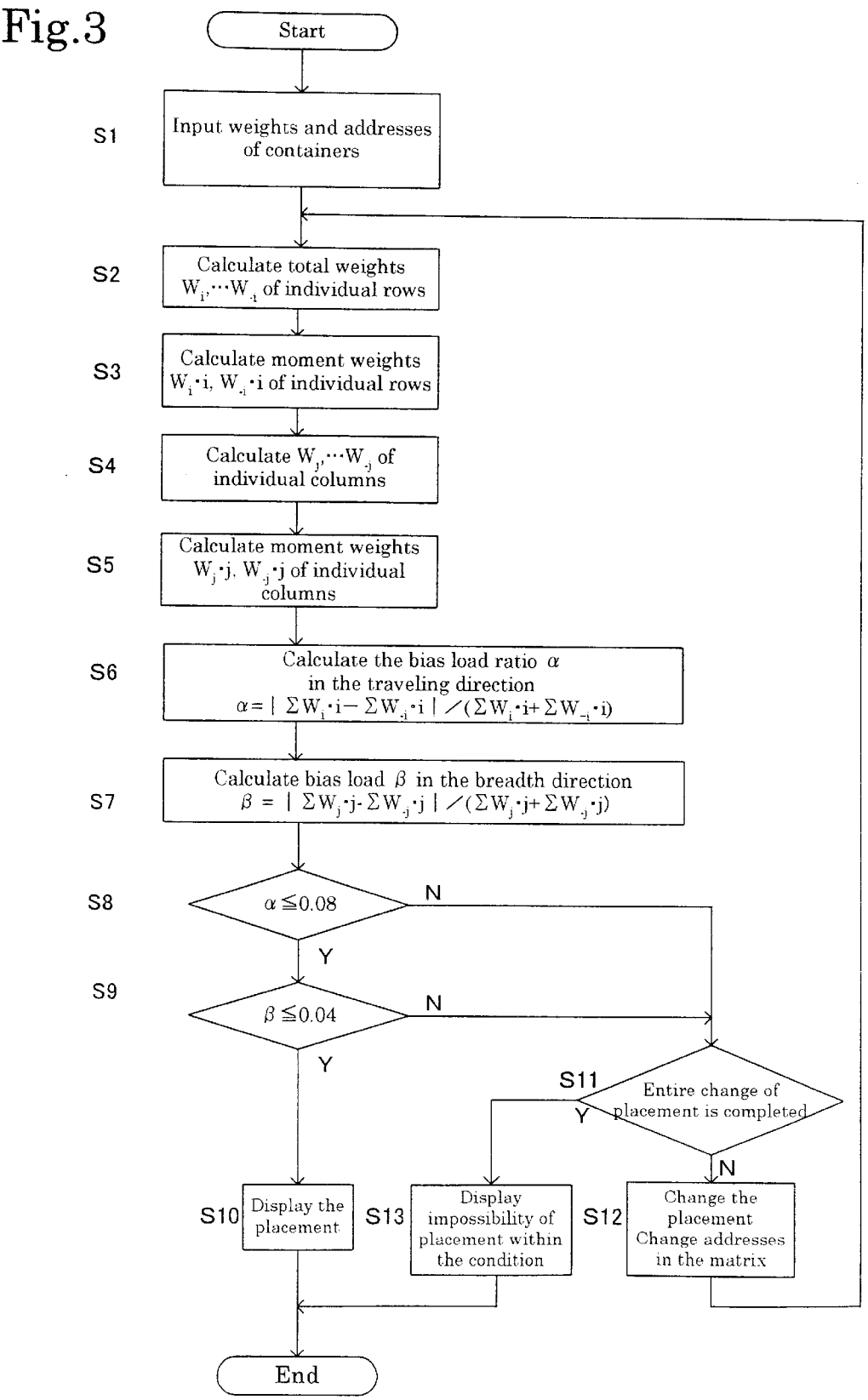
FIG. 3 is a flowchart of arithmetic processing according to an embodiment of the invention.

Procedures of the arithmetic control of the personal computer 10 are shown in FIG. 3, and explanation will be made below following to the procedures.

First, the weights $W_{11}$, $W_{12}$, ..., $W_{1n}$, $W_{21}$, $W_{22}$, ..., $W_{2n}$, ..., ..., $W_{m1}$, $W_{m2}$, ..., $W_{mn}$ of the containers 3 in the array with m rows and n columns are input into the personal computer 10 together with their addresses in the matrix and ID numbers of the individual containers 3 (step S1).

After that, as shown in FIG. 5(1), total weights of containers 3 in individual rows, namely, $W_i$, $W_{1-i}$, ..., $W_{-i}$, are calculated (step S2).

$W_i$ denotes the total weight of containers of the row that is distant forward by i rows from the platform center C, and $W_{-1}$ is the total weight of containers of the row that is distant rearward by i rows from the platform center C.

After that, moment weight $W_i \cdot i$ obtained by multiplying the total weight $W_i$ of containers of the row distant forward by i rows from the platform center C by i and moment weight $W_{-1} \cdot i$ obtained by multiplying the total weight $W_{-1}$ of containers of the row distant rearward by i rows from the platform center C are calculated for each row (step S3).

Similarly, as shown in FIG. 5(2), total weights $W_j$, $W"_{j-1}$, ..., $W_{-j}$ of containers 3 of respective columns are calculated (step S4).

$W_j$ denotes the total weight of containers of the column that is distant leftward by j columns from the platform center C, and $W_{-1}$ is the total weight of containers of the column that is distant rightward by i columns from the platform center C.

Then, moment weight $W_j \cdot j$ obtained by multiplying the total weight $W_j$ of containers of the column distant leftward by j columns from the platform center C by j and moment weight $W_{-j} \cdot j$ obtained by multiplying the total weight $W_{-j}$ of containers of the column distant rightward by j columns from the platform center C are calculated for each column (step S5).

In the next step S6, CPU calculates the bias load ratio α in the traveling direction, which is the ratio of the difference $|\Sigma W_i \cdot i - \Sigma W_{-i} \cdot i|$ between the total $\Sigma W_i \cdot i$ of moment weights of rows located forward of the platform center C and the total $\Sigma W_{-i} \cdot i$ of moment weights of rows located rearward of the platform center C relative to the sum of them ($\Sigma W_i \cdot i + \Sigma W_{-1} \cdot i$) is calculated based on the moment weights $W_i \cdot i$, $W_{-i} \cdot i$ of respective rows.

Similarly, in the next step S7, CPU calculates the bias load ratio β in the breadth direction, which is the ratio of the difference $|\Sigma W_j \cdot j - \Sigma W_{-j} \cdot j|$ between the total $\Sigma W_j \cdot j$ of moment weights of columns located leftward of the platform center C and the total $\Sigma W_{-j} \cdot j$ of moment weights of columns located rightward of the platform center C relative to the sum of them ($\Sigma W_j \cdot j + \Sigma W_{-j} \cdot j$) is calculated based on the moment weights $W_j \cdot j$, $W_{-j} \cdot j$ of respective columns.

After calculating the bias load ratio α in the traveling direction and the bias load ratio β in the breadth direction, CPU judges whether or not the bias load ratio α in the traveling direction is in the range not exceeding 0.08 (8%) (step S8). If it is in the range not exceeding 8%, it goes the step S9. In step S9, CPU judges whether or not the bias load ratio β in the breadth direction is in the range not exceeding 0.04 (4%). If it is in the range not exceeding 4%, it goes to the step S10. In step 10, the outstanding arrangement of the containers 3 is judged to be well-balanced, and that arrangement is displayed on the display 18 together with ID numbers of the containers 3.

If the bias load ratio a in the traveling direction is judged to exceed 0.08 in step S8 or the bias load ratio β in the breadth direction is judged to exceed 0.04 in step S9, CPU goes to the step S11 and judges whether the entire change of placement has been completed or not. If it is not yet completed, CPU goes to the step S12 and change placement of containers 3 to modify the matrix arrangement.

That is, CPU changes the weights $W_{11}$, $W_{12}$, ..., $W_{1n}$, $W_{21}$, $W_{22}$, ..., $W_{2n}$, ..., ..., $W_{m1}$, $W_{m2}$, ..., $W_{mn}$ of the containers 3 arranged in m rows and n columns and returns to the step S2 to repeat the arithmetic operation, thereby calculate new values of the bias load ratio α in the traveling direction and the bias load ratio β in the breadth direction and judge whether the loading balance is adequate or not.

If any arrangement does not satisfy the condition (α<0.08, β<0.04) even after the change of placement is repeated, CPU goes from the step S11 to the step S13, and displays impossibility of any acceptable placement within the condition on the display 18.

In case such impossibility of placement within he condition is displayed, it is necessary to cope with it by, for example, moving cargoes among different containers, reducing one or more of containers, or replacing one or more of containers with one or more other containers together with cargoes therein, if possible.

Figure 6:
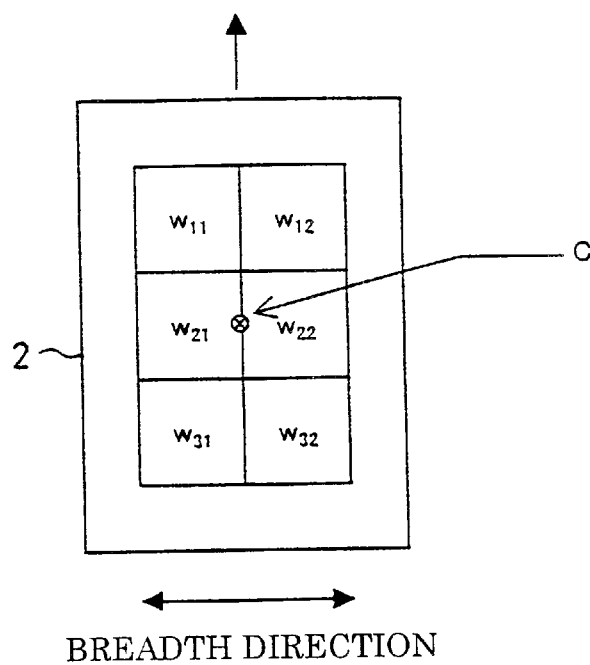
FIG. 6 is a diagram that shows an arrangement of containers in three rows and two columns on a load-carrying platform.

Here is taken an example in which six containers 3 are loaded on the load-carrying platform 2 of the truck 1 as shown in FIG. 6. Assume that these six containers 3 are loaded in three rows and two columns in the front-to-rear and right-to-left directions, namely in three rows in the traveling direction and two columns in the breadth direction. Thus the weights $W_{11}$, $W_{12}$, $W_{21}$, $W_{22}$, $W_{31}$, $W_{32}$ of containers are allocated to respective cells.

These six containers 3 are placed symmetrically of the platform center C in a close alignment of three rows and two columns, while locating heavier containers 3 closer to the platform center C for a balance as best as possible in the front-to-rear and right-to-left directions.

Figure 7:
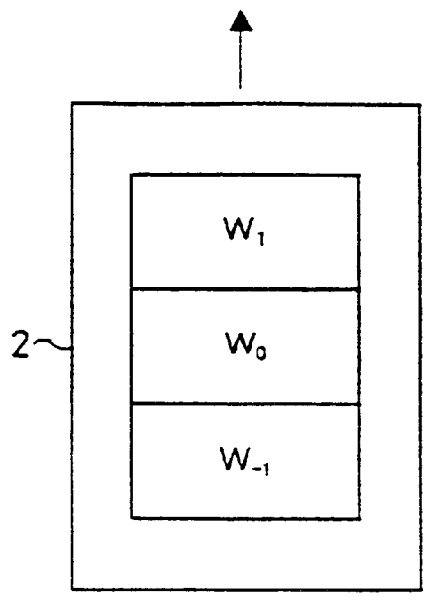
FIGS. 7(1) and 7(2) are diagrams each showing total weights of containers of individual rows and individual columns, respectively, in the arrangement of the containers shown in FIG. 6.
Figure 7:
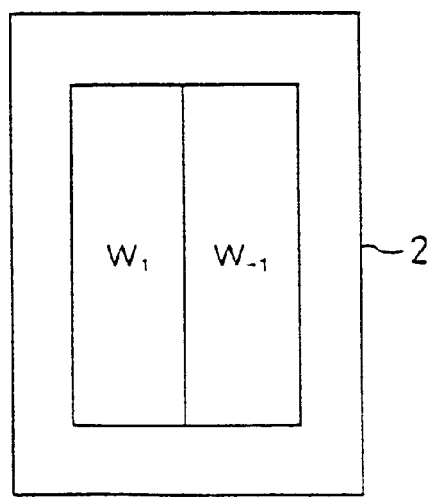

As shown in FIG. 7(1), total weights of containers, $W_i$, $W_0$, $W_{-1}$, of individual rows are calculated beforehand as follows.

Total weight $W_i$ of containers in the row distant forward by one row from the platform center C=$W_{11}$+$W_{12}$ Total weight $W_0$ of containers in the row passing the platform center C=$W_{21}$,+$W_{21}$ Total weight $W_{-1}$ of containers in the row distant rearward from the platform center C=$W_{31}$+$W_{32}$ Similarly, total weights of containers, $W_i$, $W_{-1}$, of individual columns are calculated beforehand as follows.

Total weight $W_i$ of containers in the column distant leftward by one column from the platform center C=$W_{11}$+$W_{21}$+$W_{31}$ Total weight $W_{-1}$ of containers in the column distant rightward by one column from the platform center C=$W_{12}$+$W_{22}$+$W_{32}$ After that, moment weights $W_i·1$, $W_0·0$, $W_{-1}·1$ or individual rows and moment weights $W_i·1$, $W_{-1}1$ of individual columns are calculated.

Based on those values, the bias load ratio α in the traveling direction is calculated as $$\alpha = |\Sigma W_i \cdot i - \Sigma W_{-i} \cdot i| / (\Sigma W_i \cdot i + \Sigma W_{-i} \cdot i)$$
$$= |W_1 - W_{-1}| / (W_1 + W_{-1})$$

Further, the bias load β in the breadth direction is calculated as $$\beta = |\Sigma W_j \cdot j - \Sigma W_{-j} \cdot j| / (\Sigma W_j \cdot j + \Sigma W_{-j} \cdot j)$$
$$= |W_1 - W_{-1}| / (W_1 + W_{-1})$$

As appreciated from the calculation of the bias load ratio α in the traveling direction, since the row or column passing the platform center C is calculated as i=0 or j=0, its moment weight becomes 0, and its may be excluded from the calculation.

As explained above, by simply inputting weights of containers 3 to be allocated in individual cells of the matrix, the bias load ratio α in the traveling direction and the bias load ratio β in the breadth direction are easily calculated, and depending upon whether or not the bias load ratio α in the traveling direction is in the range not exceeding 8% and whether or not the bias load ratio β in the breadth direction is in the range not exceeding 4%, the computer readily judges whether the loading balance is appropriate or not. Therefore, the method is convenient and very useful.

Therefore, any operator even not skilled can pursue the operation.

Additionally, since the above-explained arithmetic control automatically finds out a placement of containers satisfying the condition (α≦0.08, β≦0.04), it is so much more convenient.

Only if the containers 3 are loaded on the platform to satisfy this condition (α≦0.08, β≦0.04), the loading balance is adequate, and the vehicle does not lose stability even when a centrifugal load is applied to the platform 2 while it runs along a curve.

Although the embodiment has been described as placing containers 3 in a matrix in the front-to-rear and right-to-left directions without stacking them vertically, the same arithmetic operation can be used by regarding the total weight of containers stacked in each cell of the matrix as the weight of a single container.

Consequently, it is the premise of the above-described method that containers 3 are allocated to all cells of the matrix because, with any vacant cell, cargoes will not be fixed reliably, and it is intended to prevent such trouble.

If containers to be transported are insufficient to fill all cells, then a fixture material will be needed to fill the cells. By using vacant containers 3 as the fixture material, the same arithmetic operation can be used.

What is claimed is:

1. A method of loading containers in an optimum way on a load-carrying platform of a vehicle, in which a plurality of containers identical in shape are loaded in front-to-rear and left-to-right matrix arrangement symmetrically of the platform center, comprising the steps of:

calculating moment weight $W_i·i$ which is multiplication of total weight $W_i$ of containers in each row distant forward by i rows from the platform center by i;

calculating moment weight $W_{-i} \cdot i$ which is multiplication of total weight $W_{-i}$ of containers in each row distant rearward by i rows from the platform center by i;

calculating the bias load ratio in the traveling direction, which is the ratio of the difference $|\Sigma W_i \cdot i - \Sigma W_{-1} \cdot i|$ between the total $\Sigma W_i \cdot i$ of moment weights of rows located forward of the platform center C and the total $\Sigma W_{-i} \cdot i$ of moment weights of rows located rearward of the platform center C relative to the sum of same ($\Sigma W_i \cdot i + \Sigma W_{-1} \cdot i$);

calculating moment weight $W_j \cdot j$ which is multiplication of total weight $W_j$ of containers in each column distant leftward by j columns from the platform center by j;

calculating moment weight $W_{-j} \cdot j$ which is multiplication of total weight $W_{-j}$ of containers in each column distant rightward by j columns from the platform center by j;

calculating the bias load ratio in the breadth direction, which is the ratio of the difference $|\Sigma W_j \cdot j - \Sigma W_{-j} \cdot j|$ between the total $\Sigma W_j \cdot j$ of moment weights of columns located leftward of the platform center C and the total $\Sigma W_{-j} \cdot j$ of moment weights of columns located rightward of the platform center C relative to the sum of same ($\Sigma W_j \cdot j + \Sigma W_{-j} \cdot j$); and loading the containers such that the calculated bias load ratio in the traveling direction falls within a predetermined range and the calculated bias load ratio in the breadth direction falls within a predetermined range.

2. A method of loading containers in an optimum way on a load-carrying platform of a vehicle according to claim 1, wherein calculation is carried out by regarding i=0 or j=0 for containers in the row or column passing the platform center.

3. A method of loading containers in an optimum way on a load-carrying platform of a vehicle according to claim 2, wherein the containers are loaded such that the bias load ratio in the traveling direction is in a range not exceeding approximately 8% and the bias load ratio in the breadth direction is in a range not exceeding approximately 4%.

* * * * *